Nov. 7, 1967  J. S. GUILLON  3,351,313
ADJUSTABLE SHELF SUPPORT
Filed Feb. 15, 1966  2 Sheets-Sheet 1

INVENTOR.
JACQUES S. GUILLON
BY
Tweedale & Gerhardt
ATTORNEYS.

Nov. 7, 1967  J. S. GUILLON  3,351,313
ADJUSTABLE SHELF SUPPORT
Filed Feb. 15, 1966  2 Sheets-Sheet 2

INVENTOR.
JACQUES S. GUILLON
BY
Tweedale & Gerhardt
ATTORNEYS.

United States Patent Office 3,351,313
Patented Nov. 7, 1967

3,351,313
ADJUSTABLE SHELF SUPPORT
Jacques S. Guillon, Westmount, Quebec, Canada, assignor to Massey-Ferguson Industries Limited, Toronto, Ontario, Canada
Filed Feb. 15, 1966, Ser. No. 527,462
Claims priority, application Great Britain, Feb. 15, 1965, 6,469/65
11 Claims. (Cl. 248—246)

ABSTRACT OF THE DISCLOSURE

Shelf support means with two bracket plates which are clamped into a groove of a vertical post. The bracket plates have ends in the form of shells which exert holding friction inside of the post groove.

---

Numerous systems involving supporting brackets have been suggested for the attachment of shelves. In order to provide the mounting of shelves at various heights most of these systems allow the fixing of the supporting brackets at any desired horizontal plane.

The adjustability of such systems can be greatly simplified by clamping a supporting bracket into a vertical groove of a post thus allowing the fixing of a bracket at any desirable height with the possibility to change the location of mounting quickly and simply.

It is therefore an object of this invention to provide a shelf support in which a supporting bracket is adjustably mounted in the vertical groove of a post by clamping action.

It is a further object of the invention to use the securing means for attaining the clamping action of the supporting bracket as holders for the shelving which is attached to the bracket.

It is still another object of the invention to provide recesses in the edge of the shelving which are adapted to engage the screw means in the support bracket.

The instant invention is based upon a supporting bracket consisting of two plates with end portions in the form of shells which fit into a vertical groove on a post such that upon securing the two parts together, the shell-shaped end portions of the plates are laterally extended to provide a frictional holding force in the groove. The securing means for uniting the two parts of the supporting bracket also serve as holding members for the shelving attached thereto.

An embodiment of the invention will now be described by way of example with reference to the accompanying drawings in which.

Figure 1:
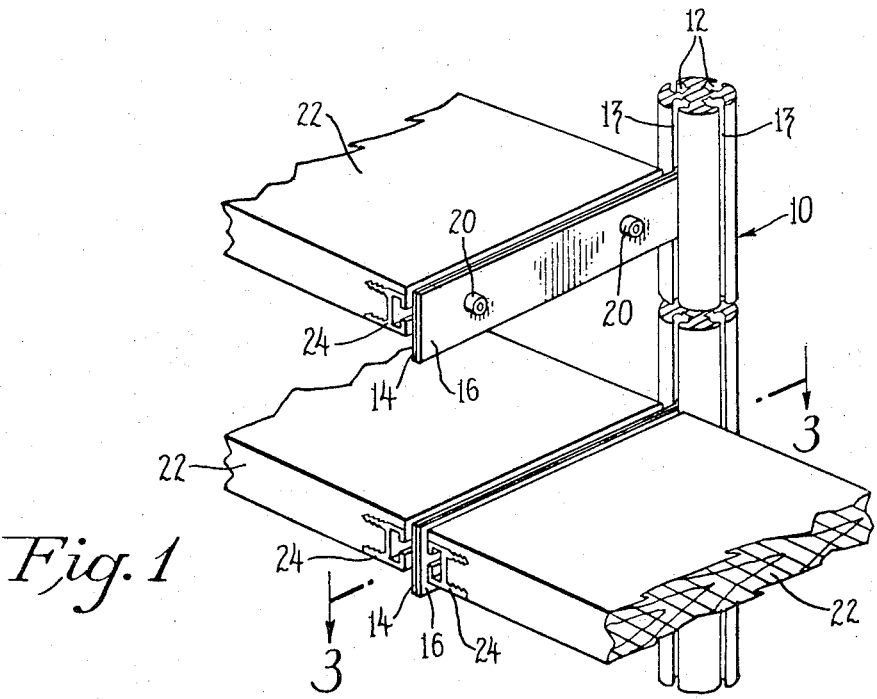
FIG. 1 is a perspective view of the shelf support mechanism with two supporting brackets inserted in a post and shelving extending therefrom.

Referring to the drawings, FIG. 1 shows an upright post 10 preferably made of aluminum which has vertical grooves 12. Each of said grooves 12 has a narrow mouth 13 leading inwardly from the surface of the post 10 and opening into a main part of generally circular configuration. Two plates 14 and 16 which serve as a supporting bracket, are each provided with a marginal edge that is shaped as a vertical semi-cylindrical shell 17. The shells 17, when the plates 14 and 16 are brought into face-to-face contact, define a cylindrical shell, the outer diameter of which is substantially the same as that of the main part of each slot 12.

Figure 2:
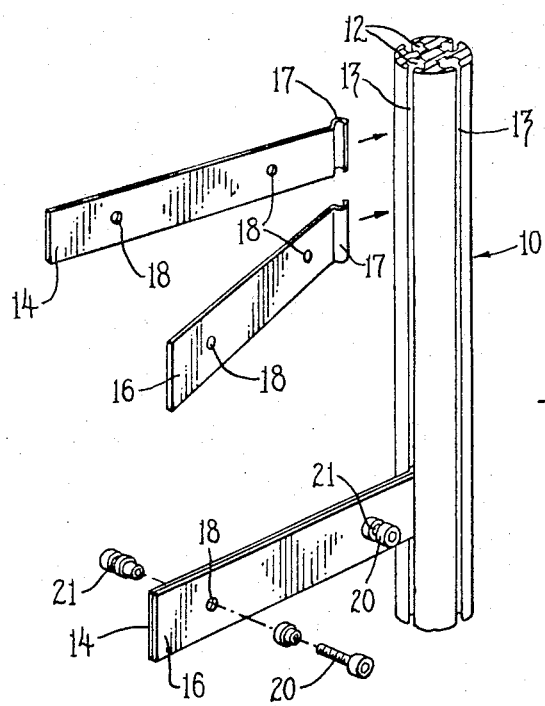
FIG. 2 shows how two portions of the supporting bracket with their shell ends fit into a groove of the post and are clamped therein.

The two plates 14 and 16 are illustrated in the upper part of FIG. 2 in their inoperative condition, and the arrows at these plates 14 and 16 indicate the manner in which they are brought into the condition shown in the lower part of FIG. 2. The plates 14 and 16 are entered into the respective groove 12 either at vertically spaced locations and are then displaced vertically to coincident vertical locations, or the dimensions of the shells 17 with respect to the mouth 13 of the grooves 12 may be such that the plates 14, 16 can be entered into the groove 12 at the same location and either in succession or simultaneously.

Figure 7:
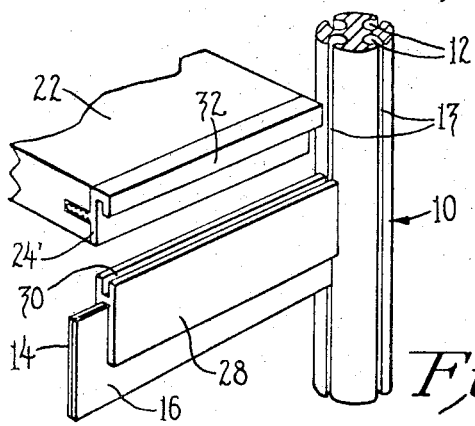
FIG. 7 shows a modification of the means for holding the two portions of the supporting brackets together and serving at the same time as a holding means for the shelving.

Once the plates 14 and 16 are in place in a groove 12 of the post 10 the plates must be tightly secured together as shown in the lower portion of FIG. 2. This can either be done by screws 20 which extend through holes in the bracket plates 14 and 16 as illustrated in FIGS. 1–6 or by an H-shaped extrusion 28 as shown in FIG. 7.

Upon using the screws 20 as securing means for uniting the plates 14, 16, the frictional clamping action of the shells 17 in a groove 12 becomes effective when the screws have been tightened.

Figure 3:
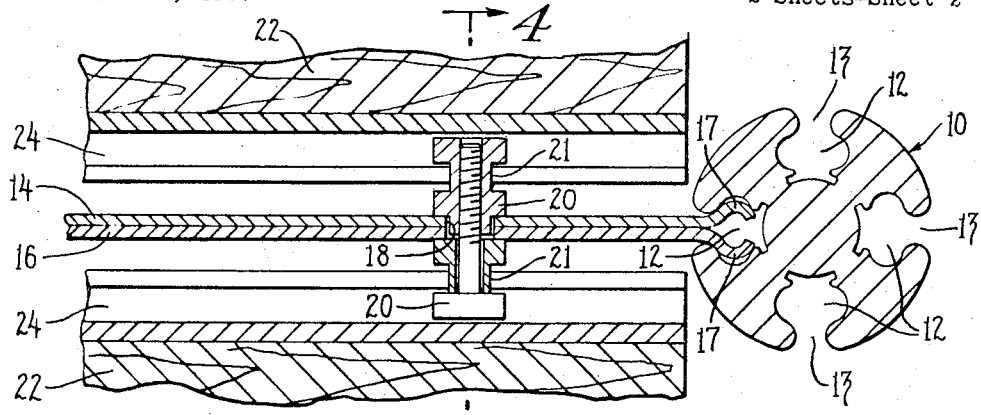
FIG. 3 shows a section along line 3—3 in FIG. 1.
Figure 4:
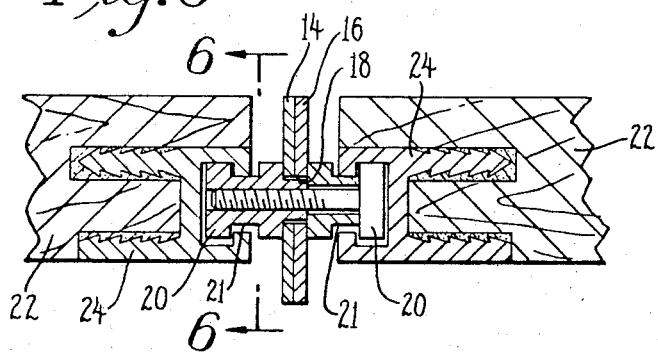
FIG. 4 shows a section of line 4—4 in FIG. 3.
Figure 5:
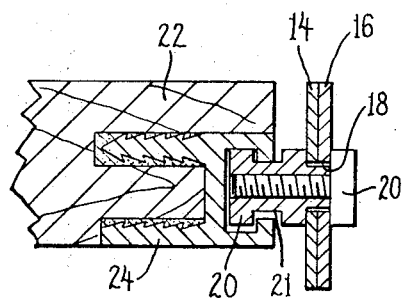
FIG. 5 illustrates the interengagement between a shelf and the screw means in one embodiment of the invention.
Figure 6:
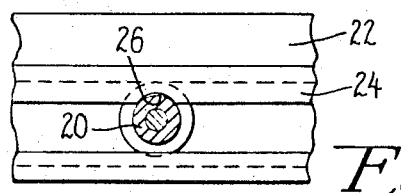
FIG. 6 is a section along line 6—6 in FIG. 4.

As FIGS. 1, 3, 4 and 5 show, shelves 22 are carried laterally on each bracket 14, 16. As best shown in FIGS. 3 and 4, the screws 20 have circumferential notches 21 which serve as holding means for the shelves 22. In order to attain a positive connection between the shelves 22 and the brackets 14, 16, metal reinforcing strips 24 are provided at an edge of each shelf 22. These metal reinforcing strips 24 have recesses 26 (FIG. 6) at one side thereof. The spacing of the recesses 26 corresponds to the spacing of the holes 18 in the bracket plates 14, 16, thereby allowing engagement of each screw 20 with one of the recesses 26.

Added stability is given to the shelf support structure by a certain amount of cutting of the edges of the shells 17 into the wall of the respective groove 12 when the weight of the shelf and the articles placed thereon is effective. This slight cutting action increases the frictional hold between bracket 14, 16 and groove 12.

Upon using an H-shaped extrusion 28 (FIG. 7) to secure the bracket plates 14 and 16 together, different holding means are required than in the case of using screws for that purpose. As shown in FIG. 7, the H-shaped extrusion 28 has a channel 30 into which a corresponding rail 32 at the metal insert 24' on the shelf 22 engages.

Figure 8:
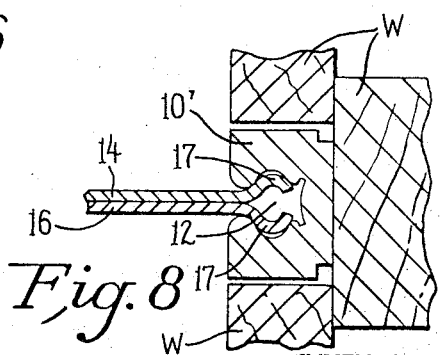
FIG. 8 illustrates a modification of the post when the post is inserted into a wall.

Instead of attaching the bracket plates 14, 16 to a round post 10 with a plurality of grooves 12 (FIGS. 1, 2 and 3), a post 10' (FIG. 8) with only one groove can be inserted into a wall W thus providing a structure for placing adjustable shelving against a wall.

I claim:

1. An adjustable shelf support comprising in combination, an upright post having vertical groove means with a narrow mouth leading inwardly from the surface of the post and opening into a main part of generally circular configuration, two bracket plates of rectangular shape, at one end of each of said plates being deformed into a vertical semi-cylindrical shell, said plates being in face-to-face contact with said juxtaposed shells firmly seated in said groove, and securing means pressing said plates together at the inner end portions of said shells, said end portions being seated inside said groove and forming fulcrum points upon pressing together said bracket plates, thereby exerting strong holding friction upon said shells in said groove.

2. An adjustable shelf support as claimed in claim 1 wherein said groove means are a plurality of grooves spaced around the surface of the vertical post and extending along the post parallel to each other.

3. An adjustable shelf support as claimed in claim 1 wherein said post is of aluminum.

4. An adjustable shelf support as claimed in claim 1 wherein said post is imbedded in a wall having one single groove opening toward the front side thereof.

5. An adjustable shelf support as claimed in claim 1 wherein said securing means are screws with lateral circumferential notches.

6. An adjustable shelf support according to claim 5, further comprising shelving, said shelving having at one edge thereof slot means, said slot means engaging said lateral circumferential notches of the screw means.

7. An adjustable shelf support according to claim 6 wherein shelving is provided on both sides of the bracket.

8. An adjustable shelf support as claimed in claim 6, further comprising recesses in the upper portions of said slot means in the shelving, said recesses being spaced in correspondence with the spacing of the holes in the bracket parts.

9. An adjustable shelf support as claimed in claim 1 wherein said securing means is an elongated H-shaped extrusion holding said bracket plates tightly together.

10. An adjustable shelf support as claimed in claim 9 further comprising shelving, said shelving having at one edge thereof a rail, said rail engaging the upper portion of said H-shaped extrusion.

11. An adjustable shelf support as claimed in claim 1, wherein said two bracket plates are of substantially equal configuration and length.

References Cited

UNITED STATES PATENTS

| | | | |
|---|---|---|---|
| 830,232 | 9/1906 | Jordan | 248—246 |
| 2,677,519 | 5/1954 | Hobson | 248—125 |
| 3,181,923 | 5/1965 | Guillon et al. | 312—255 |
| 3,228,646 | 1/1966 | Hinrichs et al. | 248—354 |
| 3,287,867 | 11/1966 | Aton | 52—179 |

FOREIGN PATENTS

| | | |
|---|---|---|
| 838,359 | 6/1960 | Great Britain. |
| 943,214 | 12/1963 | Great Britain. |
| 951,322 | 3/1964 | Great Britain. |

JOHN PETO, *Primary Examiner.*

W. D. LOULAN, *Assistant Examiner.*